United States Patent [19]

Hoffmann et al.

[11] Patent Number: 5,007,780
[45] Date of Patent: Apr. 16, 1991

[54] ATTACHMENT MEMBER ANCHORED BY HARDENABLE MASS TO PANEL-SHAPED STRUCTURAL COMPONENT

[75] Inventors: Armin Hoffmann, Landsberg/Lech; Wolfgang Ludwig, Landsberg; Erich Leibhard, Munich, all of Fed. Rep. of Germany

[73] Assignee: Hilti Aktiengesellschaft, Fürstentum, Liechtenstein

[21] Appl. No.: 508,953

[22] Filed: Apr. 12, 1990

[30] Foreign Application Priority Data

Apr. 17, 1989 [DE] Fed. Rep. of Germany ....... 3912526

[51] Int. Cl.$^5$ .............................. F16B 39/02
[52] U.S. Cl. ..................... 411/82; 411/258; 405/260; 52/707
[58] Field of Search ...... 441/19, 23, 82, 258, 441/908; 405/260, 261; 52/704–707

[56] References Cited

U.S. PATENT DOCUMENTS

| | | | |
|---|---|---|---|
| 4,001,989 | 1/1977 | Fischer | 52/704 |
| 4,790,114 | 12/1988 | Falco | 411/82 |
| 4,836,729 | 6/1989 | Bisping et al. | 411/82 |
| 4,893,974 | 1/1990 | Fischer et al. | 411/258 |
| 4,930,284 | 6/1990 | Falco | 411/23 |

FOREIGN PATENT DOCUMENTS 2830073 1/1980 Fed. Rep. of Germany ....... 411/82

Primary Examiner—Neill R. Wilson
Attorney, Agent, or Firm—Toren, McGeady & Associates

[57] ABSTRACT

Attachment elements to be fixed to panel-shaped structural components by a hardenable material include an axially elongated dowel sleeve (1) forming a passageway extending from a second end toward a first end. An axially extending annular part (2) encircles the dowel sleeve. A bag-like member (3) is secured to the annular part and to the dowel sleeve adjacent the first ends thereof. The bag-like member is inserted through a borehole in the structural component from an outer side thereof. The bag-like member can be filled with a hardenable material providing a gripping action with an inner side of the structural component. The bag-like member, when filled with the hardenable material, has a first side facing the inner side of the structural component and an oppositely facing second side with openings in the first side being larger than the openings in the second side. As a result, when hardenable material is injected into the bag-like member, it flows out through the openings in the first side and supports the bag-like member with large area contact with the inner side of the structural component.

12 Claims, 2 Drawing Sheets

ATTACHMENT MEMBER ANCHORED BY HARDENABLE MASS TO PANEL-SHAPED STRUCTURAL COMPONENT

BACKGROUND OF THE INVENTION

The present invention is directed to an attachment member to be anchored by a hardenable mass to one side of a panel-shaped structural component. The attachment element includes a dowel sleeve with apertures for flowing the hardenable mass out of the sleeve. The sleeve has load engagement means. An annular part encircles the dowel sleeve and forms a closure when the attachment element is inserted into a borehole in the structural component. A bag-like member is secured to the ends of the dowel sleeve and the annular part leading in the insertion direction. When inserted through the structural component and filled with the hardenable mass, the bag-like member has a side facing the inner side of the structural component.

Attachment elements anchored by hardenable material are used increasingly due to their advantages, such as the absence of expansion pressure, a relatively simple setting process, and good anchoring values. In anchoring the attachment element to a panel-shaped structural component, the bag-like member, filled with the hardenable mass, and laterally surrounding the dowel sleeve, prevents the hardenable mass from flowing away. At the same time, the quantity of the hardenable mass required for the anchoring step is limited.

An attachment element with a dowel sleeve and a member enclosing the leading end of the sleeve during the insertion operation, is disclosed in DE-PS 25 47 823. After the attachment element is introduced into a borehole through a panel-shaped structural component, the member is filled with the hardenable mass, which flows into the member through outlet apertures in the dowel sleeve accordingly, the member is inflated in a balloon-like manner and grips behind the inner surface of the structural component. The contact face of the hardenable material containing member with the inner surface of the structural component, however, is relatively small, whereby if tensile loads are applied to the dowel sleeve, there is the danger that the attachment element may break through the panel-shaped structural component.

SUMMARY OF THE INVENTION

Therefore, the primary object of the present invention is to provide an attachment member anchored to a panel-shaped structural component by a hardenable material, where a reliably large contact area is provided with the inner surface or side of the structural component while adequately limiting the quantity of the required hardenable material.

In accordance with the present invention the bag-like member has openings permitting the escape of the hardenable material from the member when the material is subjected to a filling or injection pressure, at least on the side of the member facing the inner surface of the structural component. The bag-like member filled with the hardenable material, has a first side facing the structural component and an oppositely facing second side secured to the end of the dowel sleeve projecting through the structural component.

Part of the hardenable material can escape through openings in the bag-like member. The hardenable material escaping from the side of the member facing the structural component forms a large area of contact, greater than that of the member, with the inner surface of the structural component. In the event a tensile load is applied to the dowel sleeve, the pressure exerted by the hardenable mass acting on the structural component is distributed over a larger area. With the bag-like member connected, on the one hand, to the annular part, and on the other hand, to the dowel sleeve, the introduction of the attachment element into a borehole in a structural component is facilitated. For such insertion, the dowel sleeve is pulled back opposite to the setting or insertion direction relative to the annular part, so that initially the leading or first ends of the dowel sleeve and the annular part are adjacent to one another and the opposite sides of the bag-like member extend outwardly approximately flat upon one another. In this position, the jacket can be folded together in an umbrella-like manner and introduced into a prepared borehole in the structural component. In another embodiment, the dowel sleeve is pulled completely out of the annular part, opposite to the insertion direction. With the bag-like member connected to both parts, it is pulled through the annular part. After the annular part is inserted into the borehole in the structural component, the dowel sleeve is inserted through the annular part and the bag-like member is pulled inside out and is located on the inner side or surface of the structural component. In this position, the dowel sleeve and the annular part can be interengaged with one another.

The apertures in the dowel sleeve passageway are shaped so that the hardenable mass escapes when it is injected under pressure. The filling pressure develops, for instance with the use of foaming materials by the foaming pressure or with materials which are introduced under injection pressure by known supply devices. With the bag-like member provided with openings over its entire surface, the openings on the side facing away from the structural component, are preferably of smaller cross-section than those on the side facing the structural component, with the result that at the side facing away from the structural component, there is only a slight penetration or passage of the hardenable material through the member. On the side facing the structural component, the openings are such that the quantity of the hardenable material is sufficient for the desired effect, in accordance with the invention. The hardenable material escaping from the bag-like ember side facing away from the structural component forms, after hardening, a solid external skin, reinforcing the bag-like member. The hardenable material escaping from the side of the bag-like member facing the structural component fills the space between the member and the structural component so that the desired large area contact with the inner side of the structural component is effected. In spite of the presence of the openings through the bag-like member, the required quantity of the hardenable material is maintained within economically acceptable limits.

The flow of the hardenable material from the side facing the inner surface of the structural component and from the side of the member facing away from the structural component can be preferably achieved with the bag-like member having more openings per unit area on the side facing the inner surface of the structural component than on the opposite side.

In a preferred arrangement, the bag-like member is formed of a woven fabric. Such a fabric is permeable to air and permits effective filling of the bag-like member with the hardenable material. In addition, such a fabric member is permeable for the hardenable material depending on the density of the weave and can be relatively easily folded for introduction of the attachment element into a borehole in the panel-shaped structural component.

The desired flow of the hardenable material from the bag-like member is achieved by using a fabric with different mesh widths, so that the mesh width of the side facing the inner surface of the structural component is larger than the oppositely facing side. Accordingly, the quantity of hardenable material required for abutment at the inner surface of the structural component can escape in the region of the larger mesh width.

The fabric forming the bag-like member may be woven of synthetic fibers, such as Nylon, Dralon and the like. Such materials have a high flexibility and are chemically resistant to most conventional hardenable materials. In addition to the mentioned synthetic fibers, it is also possible to use cotton fabrics, woolen fabrics and the like, all which have a good absorbency.

The bag-like member can be folded and enclosed by a destructible band so that its diameter is essentially equal to the external diameter of the annular part. The jacket is folded for introduction into a borehole and is held together by the band. After it is introduced through the borehole, the band is destroyed or broken and the jacket is spread laterally outwardly relative to the dowel sleeve. The band may be formed of paper, plastics material and the like.

The outlet apertures of the dowel sleeve include valves for preventing the hardenable material being injected into the bag-like member from flowing back into the sleeve. Such valves are opened by the filling pressure when the hardenable material is injected into the bag-like member and close automatically as soon as the filling pressure no longer acts on the hardenable material. With the valves preventing backflow of the hardenable material into the dowel sleeve, it can be avoided that the hardenable material returns into the dowel sleeve and is lost without any use.

There is the possibility of using a filling assist with a diaphragm-like flap, closable when subjected to the filling pressure of the hardenable material at the dowel sleeve instead of using valves. Such a filling assist can be used once or several times.

Preferably, the bag-like member is formed by two disc-like blanks, each dimensioned to provide a radially outer circumferentially extending flange-like edge, separating the side of the member facing away from the inner surface of the structural component from the side facing the inner surface.

The flange-like edge, formed by an overdimension of the blanks prevents the hardenable mass, escaping from the jacket on the side facing the inner surface of the structural component, from flowing around to the other side. With the flange-like outer edge, the resulting overdimension increases the contact area between the bag-like member and the hardenable mass escaping from the side of the member facing the inner surface of the structural component.

The two sides forming the bag-like member can be connected to one another at specific locations. By selection of the connecting locations, the filling volume of the bag-like member and the quantity of the hardenable material required to fill the member can be reduced. For all intents and purposes, the anchoring value of the attachment element is unaffected.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
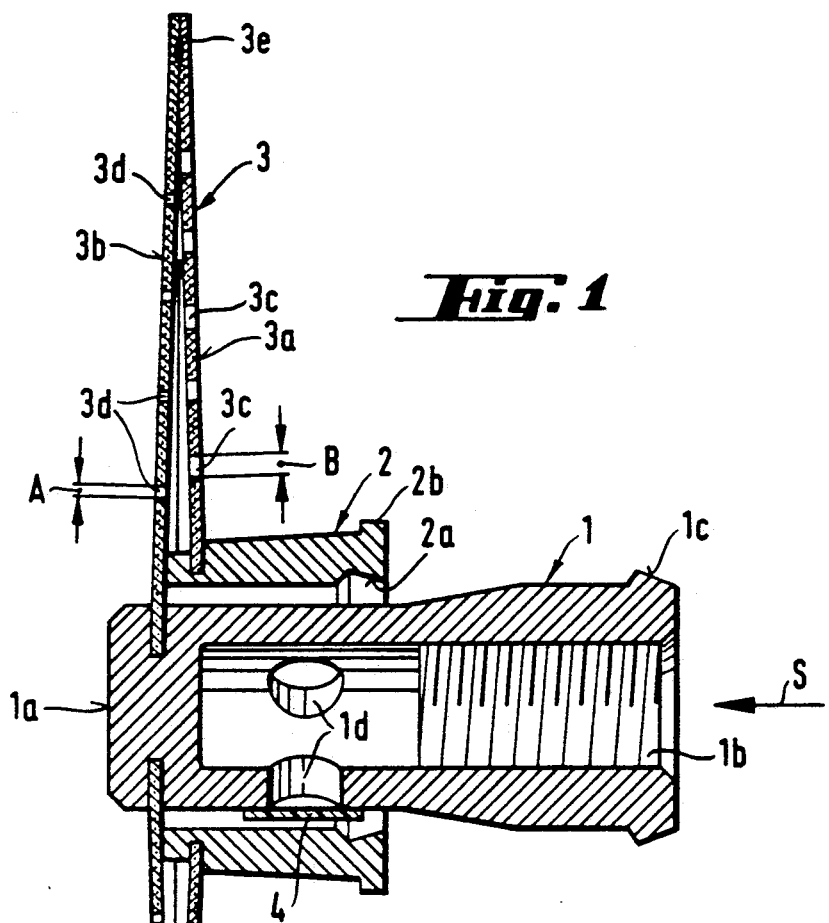
FIG. 1 is an axially extending sectional view of an attachment element embodying the present invention prior to the insertion of the element through a borehole in a panel-shaped structural component.
Figure 3:
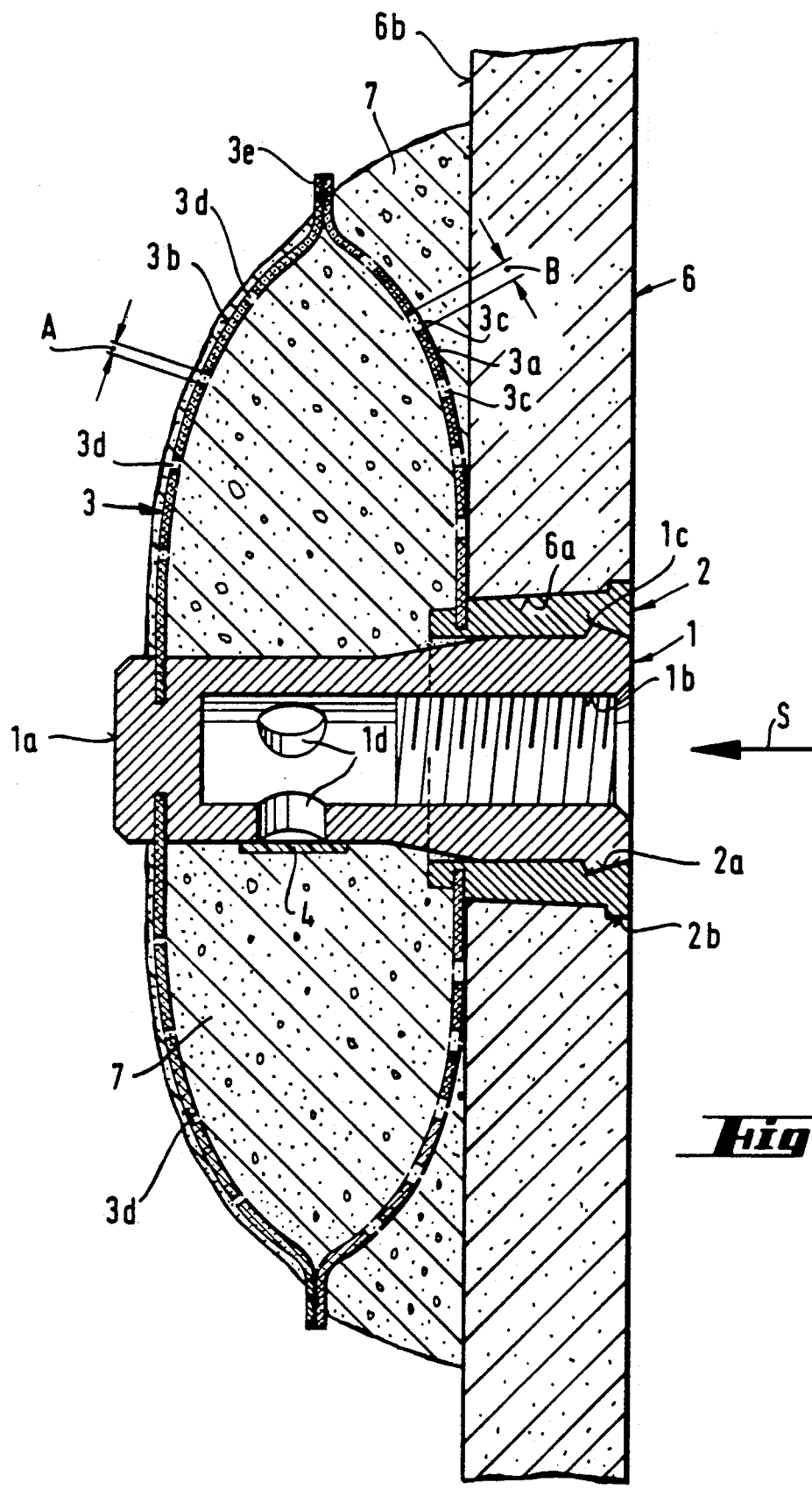
FIG. 3 is an axially extending cross-sectional view, similar to FIGS. 1 and 2, however, with the attachment element inserted through a borehole in a structural component and illustrated in the finished anchored state.

In the drawings, an attachment element is illustrated, intended to be inserted through a borehole 6a in a structural element 6. The attachment element comprises an axially elongated dowel sleeve 1, shown in FIG. 1, before it is inserted into the borehole 6a. The arrow S indicates the insertion direction with the sleeve having a leading or first end 1a and a trailing or second end. The sleeve forms a passageway extending from the second end toward the first end 1a. However, the first end is closed so that the sleeve forms a blind passageway. Adjacent the second end, the passageway has an internal thread 1b for connecting a load to the attachment element. Extending circumferentially around the dowel sleeve at its second end, there is an outwardly extending projection 1c. Within the passageway, in dowel sleeve 1, there are outlet apertures 1d extending through its side surfaces adjacent to the first end 1a. An annular part 2 encircles the dowel sleeve 1. Annular part 2 has a circumferentially extending groove 2a in its inner surface at the trailing or second end of the part. The annular part has a first end, as shown in FIG. 1, located close to the first end 1a of the dowel sleeve 1. When the dowel sleeve 1 is moved in the setting direction S, relative to the annular part 2, the circumferential projection 1c of the sleeve engages within the circumferential groove 2a, note FIG. 3. At its second end, annular part 2 has a radially outwardly projecting collar 2b. Collar 2b serves as a stop when the annular part 2 is inserted into the borehole 6a of the relatively thin panel-shaped structural component 6. As shown in FIG. 1, a bag-like member 3 in the collapsed condition is secured to the dowel sleeve 1 and the annular part 2 adjacent the first ends of each. Bag-like member 3 has a first side 3a which faces an inner surface of the structural component 6 when the attachment element is inserted through the borehole 6a in the structural component 6. Note FIG. 3 where the first side 3a faces the inner surface 6b of the structural component. A second side 3b of the bag-like member faces away from the structural component 6. First side 3a has openings 3c, while second side 3b has openings 3d. The cross-section A of the openings 3d in the second side 3b, facing away from the structural component 6, note FIG. 3, is smaller than the cross-section B of the openings 3c in the first side 3a of the bag-like member 3, which side faces the inner surface 6b of the structural component 6. Further, more openings are provided per unit area in the first side 3a than in the second side 3b. As a result, the bag-like member is more permeable on the first side 3a, facing the structural component 6, than on the second side 3b, facing away from the structural component.

Outlet apertures 1d in the dowel sleeve 1 are closed by valves 4. Valve 4 acts as a check valve and closes automatically after the filling pressure directing a hardenable material into the bag-like member is discontinued. As a result, the hardenable material cannot experience backflow from the bag-like member 3 into the passageway in the dowel sleeve 1.

Figure 2:
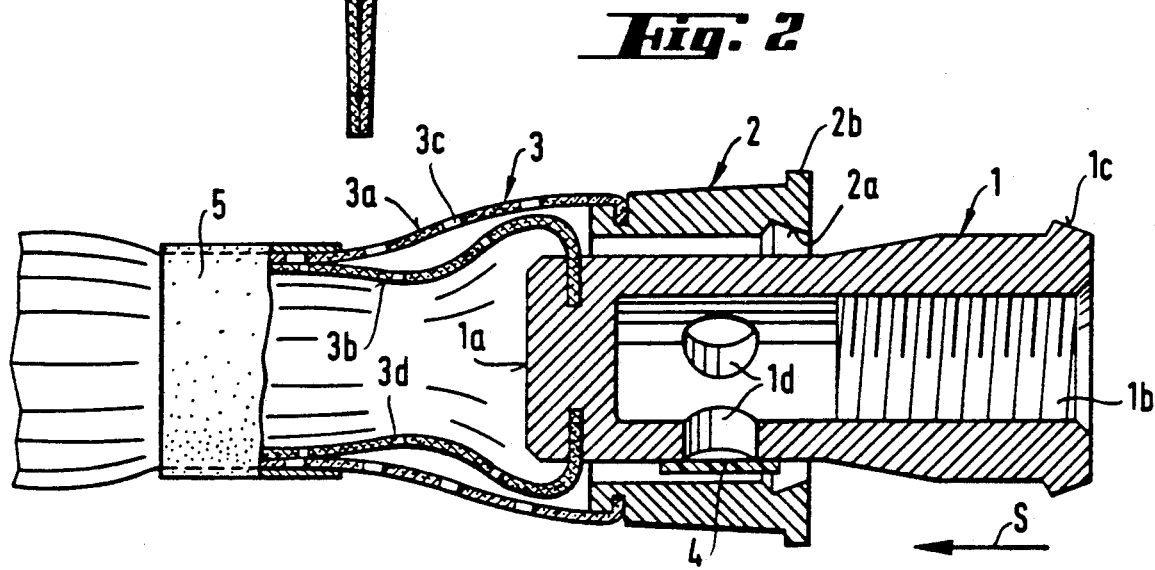
FIG. 2 is a sectional view, similar to FIG. 1, however, with the bag-like member folded into position ready to be inserted through the structural component.

In FIG. 2, the bag-like member 3 is folded from the position shown in FIG. 1 into a condition so that it can be inserted through the borehole 6a of the structural component 6, that is, as viewed in FIG. 3, it is inserted in the direction S from the right-hand side to the left-hand side of the structural component. A paper band 5 encircles the folded bag-like member 3 and secures it in the condition shown in FIG. 2. In this folded condition, the assembled structural element can be inserted through the borehole 6a of the structural component 6. During the insertion or setting of the attachment element, flange 2b on the annular part 2 contacts the outer surface of the structural component 6. With the annular part 2 inserted into the borehole, the dowel sleeve 1 is displaced in the direction S through the annular part until its projection 1c snaps into the recess 2a. After the band 5 is broken, the bag-like member opens from the folded condition and grips the inner surface 6b of the component 6. Subsequently, the hardenable material 7 is injected into the bag-like member 3, flowing through the passageway in the dowel sleeve 1 and through the apertures 1d which, as can be seen in FIG. 3, are located in spaced relation from the first end of the annular part 2. As the bag-like member 3 is filled, a part of the hardenable material 7 flows through the openings 3c, 3d in the bag-like member. Since the openings 3d in the second side 3b, facing away from the structural component 6, are smaller than the openings 3c in the first side 3a facing the inner surface 6b of the structural component 6, a smaller share of the hardenable material 7 escapes from the bag-like member on the second side than from the first side 3a. Accordingly, the gap between the first side 3a of the bag-like member 3 and the adjacent inner surface 6b of the structural component 6 is filled with the hardenable material, note FIG. 3, and as a result, the bag-like member has a large contact area with the inner surface 6b of the structural component. The first and second sides 3a, 3b of the bag-like member 3 are cut as annular blanks with an overdimension 3e forming a flange extending circumferentially around the radially outer edge of the bag-like member 3. The flange-like edge blocks flow of the hardenable mass 7, escaping from the bag-like member 3 from moving from the first side 3a of the bag-like member to the second side 3b. Further, the flange-like edge based on the overdimension 3e affords, in addition, a large area of contact of the bag-like member 3 via the hardenable material 7 escaping from the bag-like member from the first side 3a into contact with the inner surface 6b of the component 6.

Bag-like member 3 is preferably formed of a woven fabric. Such a woven fabric bag-like member can have different mesh widths, whereby the mesh width of the first side 3a is larger than the mesh width of the second side 3b which faces away from the structural component 6. Accordingly, more hardenable material 7 escapes from the first side 3a toward the surface 6b of the component 6 than from the second side 3b in the direction away from the component. Preferably, synthetic fibers are used for the woven fabric bag-like member 3. Such synthetic fibers can be Nylon, Dralon and the like. The woven fabric forming the bag-like member 3, formed by the synthetic fibers, can be processed easily and can be bonded or welded with the dowel sleeve 1 and the annular part 2, also formed of synthetic material In place of synthetic fibers, it is also possible to form the woven fabric bag-like member 3 from cotton or wool, all of which have a good absorbency.

While specific embodiments of the invention have been shown and described in detail to illustrate the application of the inventive principles, it will be understood that the invention may be embodied otherwise without departing from such principles.

We claim:

1. Attachment elements to be fixed to panel-shaped structural components by a hardenable material comprising an axially elongated dowel sleeve (1) having a first end (1a) leading in the direction in which said dowel sleeve is inserted through a borehole in the structural component and an oppositely directed second end, said dowel sleeve having a passageway extending from the second end toward the first end, said dowel sleeve having apertures extending therethrough from said passageway to exterior of said dowel sleeve, load attachment means within said passageway, an annular part encircling said dowel sleeve and having a first end and a second end with the first end located closer to the first end of said dowel sleeve than the second end of said annular part, said annular part arranged to fit closely in the borehole in the structural component through which said dowel sleeve is inserted and a bag-like member arranged to receive the hardenable material and fixed to said dowel sleeve adjacent the first end thereof and to said annular part adjacent the first end thereof, said bag-like member arranged to be inserted through the borehole in the structural component so that in the inserted condition said bag-like member is located on an inner side of the structural component opposite an outer side through which the dowel sleeve is first inserted, said bag-like member having a first side and an oppositely facing second side with said first side facing the inner side of the structural component after said dowel sleeve and annular part are inserted through the borehole in the structural component, said first side of said bag-like member being fixed to said annular part, wherein the improvement comprises that said apertures in said dowel sleeve open into said bag-like member, at least said first side of said bag-like member comprises openings therethrough for permitting excess hardenable material injected into said bag-like member through said dowel sleeve and apertures therein to pass outwardly from said bag-like member, said second side of said bag-like member is connected to said dowel sleeve, and said first and second sides being joined together radially outwardly from said annular part.

2. Attachment elements, as set forth in claim 1, wherein said bag-like member (3) has openings (3d) through the second side (3b) with the openings (3d)

having a cross-section A smaller than a cross-section B of openings (3c) in the first side (3a) of the bag-like member (3).

3. Attachment elements, as set forth in claim 2, wherein said bag-like member has more openings per unit area in the first side (3a) than in the second side (3b).

4. Attachment elements, as set forth in claim 3 wherein said first and second sides of said bag-like member are formed of a woven fabric.

5. Attachment elements, as set forth in claim 4 wherein said first and second sides (3a, 3b) of said woven fabric bag-like member have different mesh widths with the mesh width of said first side (3a) being larger than the mesh width of said second side (3b).

6. Attachment elements, as set forth in claim 4, wherein the woven fabric of said bag-like member (3) is formed of synthetic fibers.

7. Attachment elements, as set forth in claim 1, wherein said bag-like member (3) can be arranged in a folded condition secured by a destructible band (5) so that in the folded condition the diameter of said bag-like member (3) corresponds to an external diameter of said annular part (2) so that said bag-like member can be inserted through the borehole in the structural component.

8. Attachment elements, as set forth in claim 1, wherein said apertures (1d) in said dowel sleeve (1) comprise valves (4) for preventing backflow of hardenable material into said dowel sleeve after said hardenable material has been injected through said apertures in said dowel sleeve into said bag-like member.

9. Attachment elements, as set forth in claim 1, wherein said bag-like member has a pair of annular blanks forming said first and second sides (3a, 3b) with said blanks having a radially outer circumferential edge formed with an overdimension (3e) so that with said first and second sides are secured together and said overdimension forms an annular flange-like extension separating the first side (3a) and the second side (3b).

10. Attachment elements, as set forth in claim 1, wherein said dowel sleeve (1) is closed at the first end (1a) forming a blind passageway with said apertures (1b) located in said passageway adjacent said first end.

11. Attachment elements, as set forth in claim 1, wherein means on said annular part (2) and said dowel sleeve (1) for interengaging said dowel sleeve with said annular part after the attachment element is inserted through the borehole in said structural component.

12. Attachment elements, as set forth in claim 1, wherein said bag-like member is collapsible into a folded condition for insertion through the borehole in the structural component and is openable from the folded condition by axial movement of said dowel sleeve (1) relative to said annular part (2) after said annular part is secured within the borehole in the structural component.

* * * * *